United States Patent
Bier

(10) Patent No.: US 10,495,733 B2
(45) Date of Patent: Dec. 3, 2019

(54) EXTENDABLE SENSOR MOUNT

(71) Applicant: GM GLOBAL TECHNOLOGY OPERATIONS LLC, Detroit, MI (US)

(72) Inventor: Solomon Bier, San Francisco, CA (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 0 days.

(21) Appl. No.: 15/905,337

(22) Filed: Feb. 26, 2018

(65) Prior Publication Data

US 2018/0180719 A1 Jun. 28, 2018

(51) Int. Cl.
| | |
|---|---|
| *G01S 7/481* | (2006.01) |
| *G06T 7/70* | (2017.01) |
| *G01S 17/93* | (2006.01) |
| *G01S 17/08* | (2006.01) |
| *G01S 17/02* | (2006.01) |
| *G01S 7/497* | (2006.01) |
| *G01S 13/93* | (2006.01) |
| *G01S 7/40* | (2006.01) |

(52) U.S. Cl.
CPC .......... *G01S 7/4813* (2013.01); *G01S 7/4972* (2013.01); *G01S 17/023* (2013.01); *G01S 17/08* (2013.01); *G01S 17/936* (2013.01); *G06T 7/70* (2017.01); *G01S 2007/4043* (2013.01); *G01S 2007/4975* (2013.01); *G01S 2007/4977* (2013.01); *G01S 2013/9364* (2013.01); *G01S 2013/9367* (2013.01); *G06T 2207/30244* (2013.01); *G06T 2207/30261* (2013.01)

(58) Field of Classification Search
CPC ...... G01S 7/4813; G01S 7/4972; G01S 17/08; G01S 17/023; G01S 17/936; G01S 2013/9364; G01S 2013/9367; G01S 2007/4975; G01S 2007/4043; G06T 7/70; G06T 2207/30261; G06T 2207/30244; G02S 2007/4977
See application file for complete search history.

(56) References Cited

U.S. PATENT DOCUMENTS

| | | | | |
|---|---|---|---|---|
| 9,558,584 | B1* | 1/2017 | Lo | G06T 15/205 |
| 2004/0236478 | A1* | 11/2004 | Le Gallo | E05F 15/431 |
| | | | | 701/1 |
| 2008/0011554 | A1* | 1/2008 | Broesel | B66F 9/0755 |
| | | | | 187/224 |
| 2010/0194888 | A1* | 8/2010 | McElroy | B60Q 1/143 |
| | | | | 348/148 |
| 2010/0289670 | A1* | 11/2010 | Boehme | B60Q 9/004 |
| | | | | 340/932.2 |

(Continued)

*Primary Examiner* — Sang H Nguyen
(74) *Attorney, Agent, or Firm* — Lorenz & Kopf, LLP

(57) ABSTRACT

Methods and systems are provided for adjusting a position of a sensing device relative to a vehicle. In one embodiment, a system includes the sensing device configured to provide sensor data associated with an environment of the vehicle. The system further includes an adjustable sensor mount that mounts the sensing device to the vehicle. The system further includes a control module configured to process the sensor data to a representation of the environment of the vehicle, to process the representation to determine an obstruction within a field of view of the sensing device, to determine a location of the obstruction, and to control the adjustable sensor mount to a desired position based on the location.

20 Claims, 7 Drawing Sheets

(56) References Cited

U.S. PATENT DOCUMENTS

| | | | |
|---|---|---|---|
| 2012/0330513 A1* | 12/2012 | Charnesky | G01S 13/931 |
| | | | 701/48 |
| 2014/0232871 A1* | 8/2014 | Kriel | H04N 5/2259 |
| | | | 348/148 |
| 2016/0096272 A1* | 4/2016 | Smith | B25J 9/163 |
| | | | 700/253 |
| 2016/0121794 A1* | 5/2016 | Iguchi | G08G 1/166 |
| | | | 345/7 |
| 2016/0221573 A1* | 8/2016 | Prokhorov | B60W 30/08 |

* cited by examiner

EXTENDABLE SENSOR MOUNT

TECHNICAL FIELD

The present disclosure generally relates to autonomous vehicles, and more particularly relates to systems and methods for aligning a sensor in an autonomous vehicle using an extendable sensor mount.

BACKGROUND

An autonomous vehicle is a vehicle that is capable of sensing its environment and navigating with little or no user input. An autonomous vehicle senses its environment using sensing devices such as inertial measurement units, radar, LIDAR, image sensors, and the like. The autonomous vehicle system further uses information from global positioning systems (GPS) technology, navigation systems, vehicle-to-vehicle communication, vehicle-to-infrastructure technology, and/or drive-by-wire systems to navigate the vehicle.

The sensing devices are typically mounted to the autonomous vehicle via a sensor mount. In some instances, the sensor mount may include various controllable actuators for adjusting the mount position of the sensing device relative to the vehicle. In some instances, it may be desirable to adjust the position of the sensing device in realtime. For example, the field of view of view the sensing device may become obstructed while navigating the environment. Accordingly, it may be desirable to adjust the position of the sensing device in realtime.

Accordingly, it is desirable to provide systems and methods for adjusting the position of the sensing device in realtime. It is further desirable to provide methods and system for adjusting the position of the sensing device based on a detected occlusion of the sensing device. Furthermore, other desirable features and characteristics of the present invention will become apparent from the subsequent detailed description and the appended claims, taken in conjunction with the accompanying drawings and the foregoing technical field and background.

SUMMARY

Methods and systems are provided for adjusting a position of a sensing device relative to a vehicle. In one embodiment, a system includes the sensing device configured to provide sensor data associated with an environment of the vehicle. The system further includes an adjustable sensor mount that mounts the sensing device to the vehicle. The system further includes a control module configured to process the sensor data to a representation of the environment of the vehicle, to process the representation to determine an obstruction within a field of view of the sensing device, to determine a location of the obstruction, and to control the adjustable sensor mount to a desired position based on the location.

The control module is configured to determine the obstruction within the field of view based on an analysis of free space within an image of the environment. The control module is further configured to determine the obstruction within the field of view based on an analysis of a minimum height of the freespace within the image of the environment. The control module is further configured to determine the obstruction within the field of view based on an analysis of a maximum height of the freespace within the image of the environment. The control module is further configured to determine the obstruction within the field of view based on a translation of values in the free space to values in lidar space. The values include a minimum height and a maximum height of the obstruction.

The control module is configured to determine the obstruction within the field of view based on ray tracing of lidar data. The control module is further configured to determine the obstruction within the field of view based on a polygon determined from the ray tracing. The control module is configured to determine the polygon based on a depth-first search method. The control module is further configured to determine the obstruction within the field of view based on a centroid position of the polygon determined from the ray tracing.

In another embodiment a method for adjusting a position of a sensing device relative to a vehicle is provided. The method includes: receiving sensor data sensed from an environment of the vehicle; processing, by a processor, the sensor data to determine an obstruction within a field of view of the sensing device and a location of the obstruction; and generating control signals to control an adjustable sensor mount to a desired position based on the location.

The method further includes determining, by the processor, the obstruction within the field of view based on an analysis of free space within an image of the environment. The determining, by the processor, the obstruction within the field of view is based on an analysis of a minimum height of the freespace within the image of the environment. The determining, by the processor, the obstruction within the field of view is based on an analysis of a maximum height of the freespace within the image of the environment. The determining, by the processor, the obstruction within the field of view is based on a translation of values in the free space to values in lidar space. The values include a minimum height and a maximum height of the obstruction.

The method further includes determining, by the processor, the obstruction within the field of view based on ray tracing of lidar data. The determining, by the processor, the obstruction within the field of view is based on a centroid position of a polygon determined from the ray tracing.

The method further includes determining, by the processor, the polygon based on a depth-first search method.

In another embodiment, a system for adjusting a field of view of a sensing device relative to a vehicle is provided. The system includes the sensing device configured to provide sensor data associated with an environment of the vehicle. The system further includes a non-transitory computer readable medium. The non-transitory computer readable medium further includes a first module configured to, by a processor, process the sensor data to a first representation of the environment of the vehicle; a second module configured to, by a processor, process the first representation to determine an obstruction within a field of view of the sensing device; a third module configured to, by a processor, determine a location of the obstruction within a second representation of the environment; and a fourth module configured to, by a processor, control the adjustable sensor mount to a desired position based on the location.

BRIEF DESCRIPTION OF THE DRAWINGS

The above advantage and other advantages and features of the present disclosure will be apparent from the following detailed description of the preferred embodiments when taken in connection with the accompanying drawings.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments according to the present disclosure provide a number of advantages. For example, embodiments according to the present disclosure may enable independent validation of autonomous vehicle control commands to aid in diagnosis of software or hardware conditions in the primary control system. Embodiments according to the present disclosure may thus be more robust, increasing customer satisfaction.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
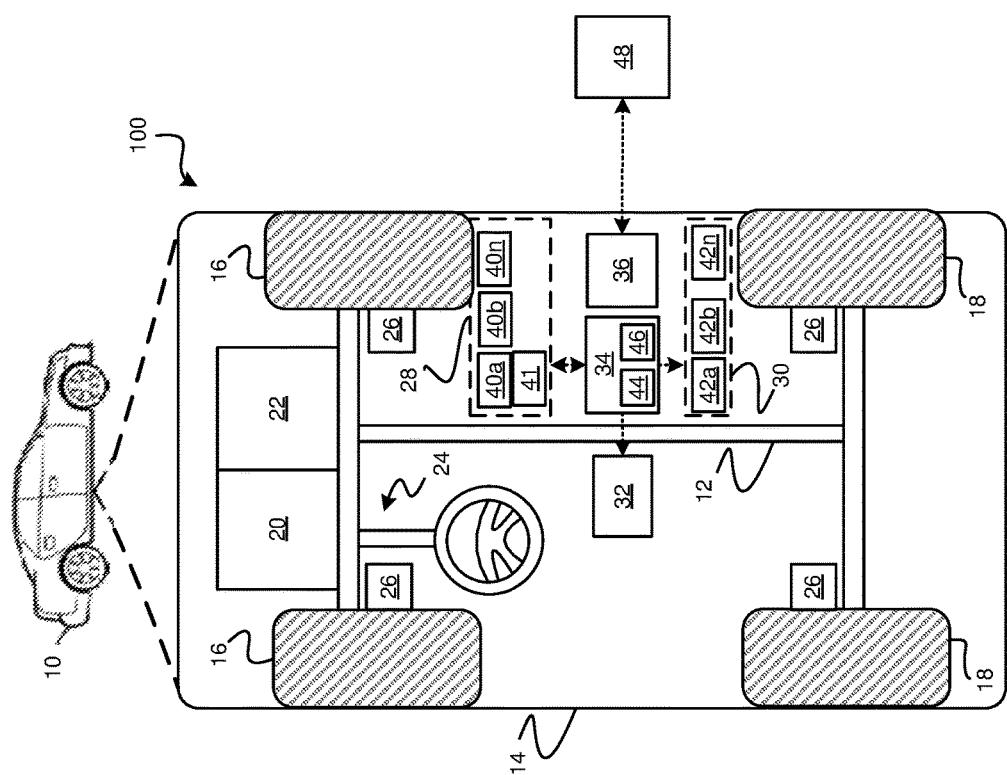
FIG. 1 is a functional block diagram illustrating an autonomous vehicle having a sensing device adjustment system, in accordance with various embodiments.

With reference to FIG. 1, a system for adjusting a position of a sensing device relative to a vehicle 10 is shown generally at 100 and is associated with the vehicle 10 in accordance with various embodiments. In general, the system 100 detects when a field of view of a sensing device is obstructed and when obstructed, controls one or more actuator devices of a sensor mount associated with the sensing device to adjust an actual position of the sensing device to a desired position, such that the field of view of the sensing device is no longer obstructed. The system 100 estimates the desired position of the sensing device in realtime with operation of the vehicle 10.

Referring now to FIG. 1 in greater detail, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous vehicle and the system 100 and is incorporated into the autonomous vehicle 10 (hereinafter referred to as the autonomous vehicle 10). The autonomous vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18. While depicted as including a steering wheel for illustrative purposes, in some embodiments contemplated within the scope of the present disclosure, the steering system 24 may not include a steering wheel.

As discussed above, the sensor system 28 includes sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, and/or other sensors. One or more of the sensing devices 40a-40n are mounted to the vehicle 10 via an adjustable mount 41. The adjustable mount 41 includes one or more actuators for adjusting pitch, roll, and/or yaw of the sensor.

The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

Figure 2:
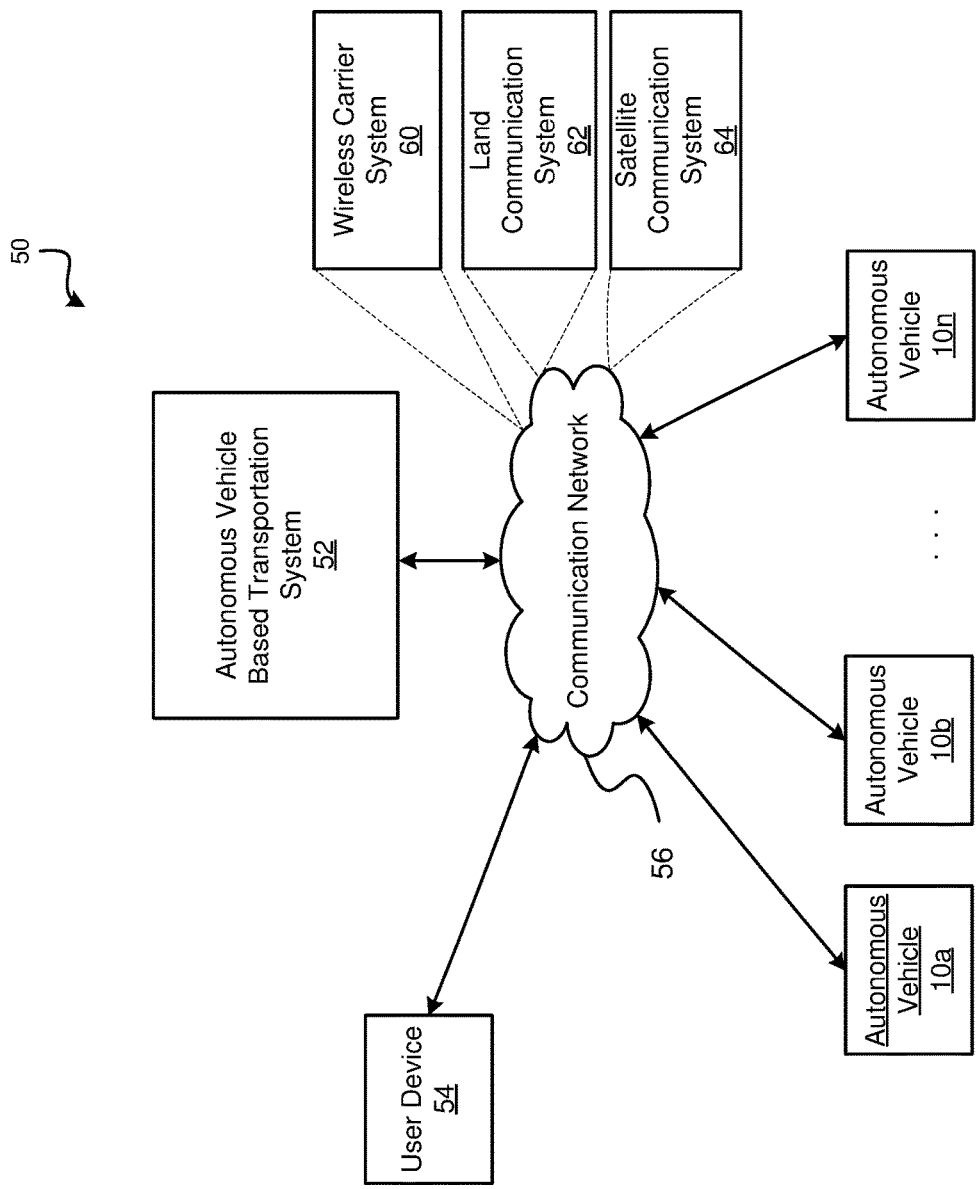
FIG. 2 is a functional block diagram illustrating a transportation system having one or more autonomous vehicles of FIG. 1, in accordance with various embodiments.

The communication system 36 is configured to wirelessly communicate information to and from other entities 48, such as but not limited to, other vehicles ("V2V" communication,) infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in automatically controlling the autonomous vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the autonomous vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the controller 34 are embodied in the system 100 and, when executed by the processor 44, detect when the field of view of the sensing device is obstructed and when obstructed, control one or more actuators of a sensor mount to adjust a position of the sensing device to thereby relieve the sensor of the obstruction.

With reference now to FIG. 2, in various embodiments, the autonomous vehicle 10 described with regard to FIG. 1 may be suitable for use in the context of a taxi or shuttle system in a certain geographical area (e.g., a city, a school or business campus, a shopping center, an amusement park, an event center, or the like) or may simply be managed by a remote system. For example, the autonomous vehicle 10 may be associated with an autonomous vehicle based remote transportation system. FIG. 2 illustrates an exemplary embodiment of an operating environment shown generally at 50 that includes an autonomous vehicle based remote transportation system 52 that is associated with one or more autonomous vehicles 10a-10n as described with regard to FIG. 1. In various embodiments, the operating environment 50 further includes one or more user devices 54 that communicate with the autonomous vehicle 10 and/or the remote transportation system 52 via a communication network 56.

The communication network 56 supports communication as needed between devices, systems, and components supported by the operating environment 50 (e.g., via tangible communication links and/or wireless communication links). For example, the communication network 56 can include a wireless carrier system 60 such as a cellular telephone system that includes a plurality of cell towers (not shown), one or more mobile switching centers (MSCs) (not shown), as well as any other networking components required to connect the wireless carrier system 60 with a land communications system. Each cell tower includes sending and receiving antennas and a base station, with the base stations from different cell towers being connected to the MSC either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 60, a second wireless carrier system in the form of a satellite communication system 64 can be included to provide uni-directional or bi-directional communication with the autonomous vehicles 10a-10n. This can be done using one or more communication satellites (not shown) and an uplink transmitting station (not shown). Uni-directional communication can include, for example, satellite radio services, wherein programming content (news, music, etc.) is received by the transmitting station, packaged for upload, and then sent to the satellite, which broadcasts the programming to subscribers. Bi-directional communication can include, for example, satellite telephony services using the satellite to relay telephone communications between the vehicle 10 and the station. The satellite telephony can be utilized either in addition to or in lieu of the wireless carrier system 60.

A land communication system 62 may further be included that is a conventional land-based telecommunications network connected to one or more landline telephones and connects the wireless carrier system 60 to the remote transportation system 52. For example, the land communication system 62 may include a public switched telephone network (PSTN) such as that used to provide hardwired telephony, packet-switched data communications, and the Internet infrastructure. One or more segments of the land communication system 62 can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote transportation system 52 need not be connected via the land communication system 62, but can include wireless telephony equipment so that it can communicate directly with a wireless network, such as the wireless carrier system 60.

Although only one user device 54 is shown in FIG. 2, embodiments of the operating environment 50 can support any number of user devices 54, including multiple user devices 54 owned, operated, or otherwise used by one person. Each user device 54 supported by the operating environment 50 may be implemented using any suitable hardware platform. In this regard, the user device 54 can be realized in any common form factor including, but not limited to: a desktop computer; a mobile computer (e.g., a tablet computer, a laptop computer, or a netbook computer); a smartphone; a video game device; a digital media player; a piece of home entertainment equipment; a digital camera or video camera; a wearable computing device (e.g., smart watch, smart glasses, smart clothing); or the like. Each user device 54 supported by the operating environment 50 is realized as a computer-implemented or computer-based device having the hardware, software, firmware, and/or processing logic needed to carry out the various techniques and methodologies described herein. For example, the user device 54 includes a microprocessor in the form of a programmable device that includes one or more instructions stored in an internal memory structure and applied to receive binary input to create binary output. In some embodiments, the user device 54 includes a GPS module capable of receiving GPS satellite signals and generating GPS coordinates based on those signals. In other embodiments, the user device 54 includes cellular communications functionality such that the device carries out voice and/or data communications over the communication network 56 using one or more cellular communications protocols, as are discussed herein. In various embodiments, the user device 54 includes a visual display, such as a touch-screen graphical display, or other display.

The remote transportation system 52 includes one or more backend server systems, which may be cloud-based, network-based, or resident at the particular campus or geographical location serviced by the remote transportation system 52. The remote transportation system 52 can be manned by a live advisor, or an automated advisor, or a combination of both. The remote transportation system 52 can communicate with the user devices 54 and the autonomous vehicles 10a-10n to schedule rides, dispatch autonomous vehicles 10a-10n, and the like. In various embodiments, the remote transportation system 52 stores store account information such as subscriber authentication information, vehicle identifiers, profile records, behavioral patterns, and other pertinent subscriber information.

In accordance with a typical use case workflow, a registered user of the remote transportation system 52 can create a ride request via the user device 54. The ride request will typically indicate the passenger's desired pickup location (or current GPS location), the desired destination location (which may identify a predefined vehicle stop and/or a user-specified passenger destination), and a pickup time. The remote transportation system 52 receives the ride request, processes the request, and dispatches a selected one of the autonomous vehicles 10a-10n (when and if one is available) to pick up the passenger at the designated pickup location and at the appropriate time. The transportation system 52 can also generate and send a suitably configured confirmation message or notification to the user device 54, to let the passenger know that a vehicle is on the way.

As can be appreciated, the subject matter disclosed herein provides certain enhanced features and functionality to what may be considered as a standard or baseline autonomous vehicle 10 and/or an autonomous vehicle based remote transportation system 52. To this end, an autonomous vehicle and autonomous vehicle based remote transportation system can be modified, enhanced, or otherwise supplemented to provide the additional features described in more detail below.

Figure 3:
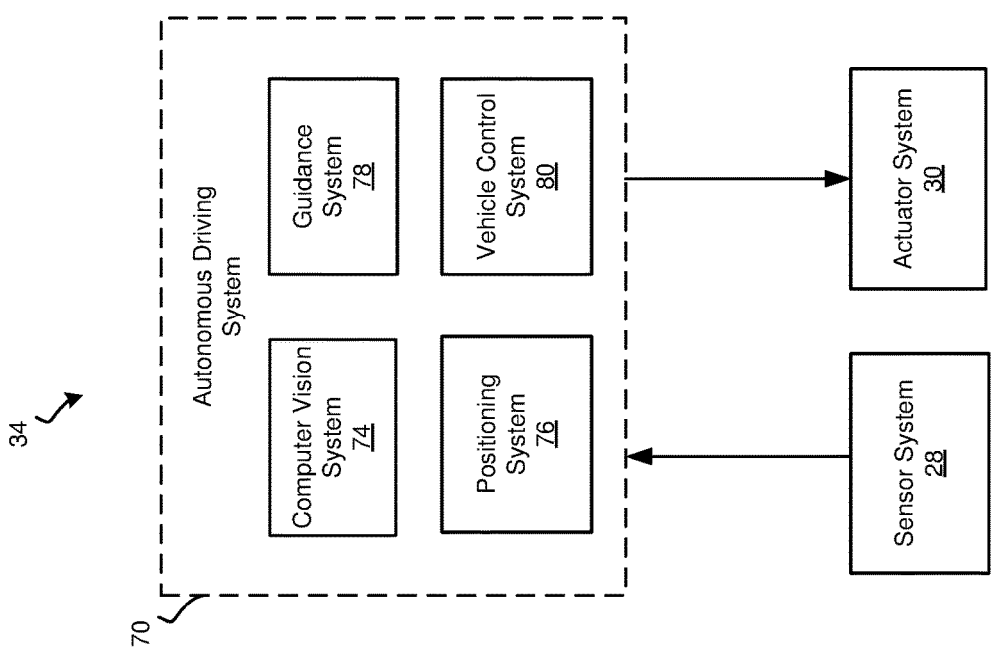
FIG. 3 is a functional block diagram illustrating an autonomous driving system, in accordance with various embodiments.

In accordance with various embodiments, controller 34 implements an autonomous driving system (ADS) 70 as shown in FIG. 3. That is, suitable software and/or hardware components of controller 34 (e.g., processor 44 and computer-readable storage device 46) are utilized to provide an autonomous driving system 70 that is used in conjunction with vehicle 10.

In various embodiments, the instructions of the autonomous driving system 70 may be organized by function or system. For example, as shown in FIG. 3, the autonomous driving system 70 can include a computer vision system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the computer vision system 74 synthesizes and processes sensor data and predicts the presence, location, classification, and/or path of objects and features of the environment of the vehicle 10. In various embodiments, the computer vision system 74 can incorporate information from multiple sensors, including but not limited to cameras, lidars, radars, and/or any number of other types of sensors.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow. The vehicle control system 80 generates control signals for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

As mentioned briefly above, system 100 of FIG. 1, detects when the field of view of the sensing device is obstructed and when obstructed, controls one or more actuators of a sensor mount to adjust a position of the sensing device. All or parts of the system 100 may be included within the computer vision system 74.

Figure 4:
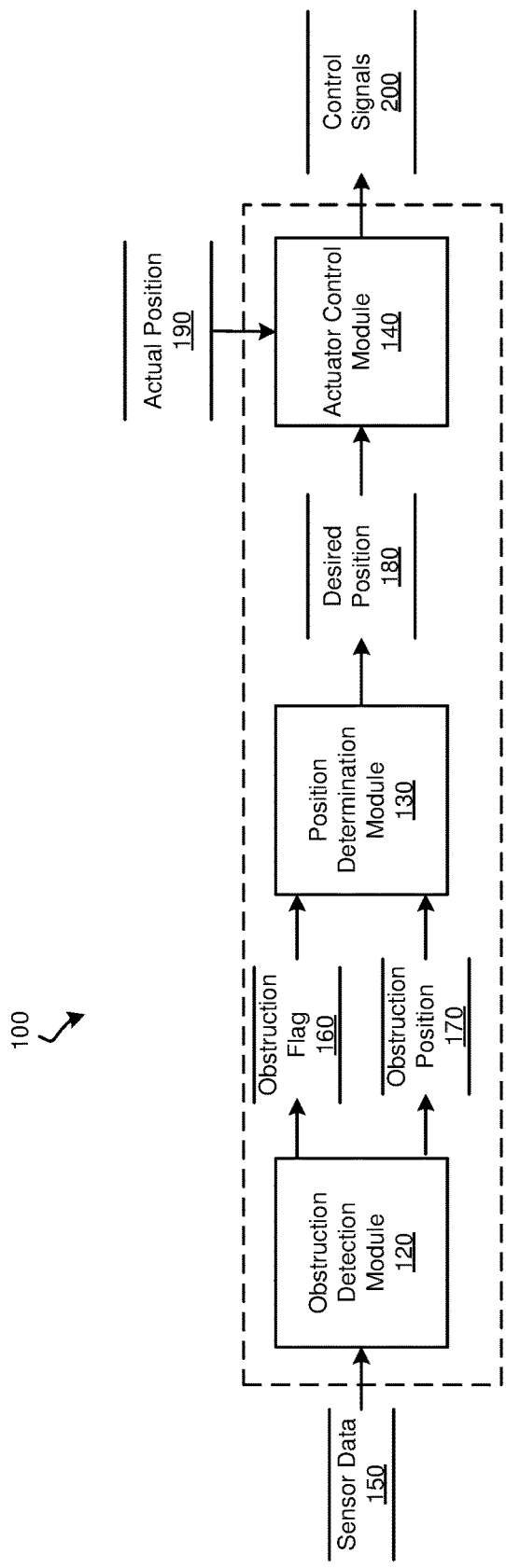
FIG. 4 is a dataflow diagram illustrating the sensing device adjustment system, in accordance with various embodiments.

For example, as shown in more detail with regard to FIG. 4 and with continued reference to FIGS. 1-3, a non-limiting example of the system 100 may be incorporated into the ADS 70. It should be appreciated that the overall architecture, setup and operation, as well as the individual components of the illustrated system 100 are merely exemplary and that differently configured systems may also be utilized to implement the examples of the system 100 disclosed herein. Thus, the following paragraphs, which provide a brief overview of the illustrated system 100, are not intended to be limiting.

The system 100 generally includes an obstruction detection module 120, a position determination module 130, and an actuator control module 140. The obstruction detection module 120 receives sensor data 150 that has been obtained by the sensing devices scanning an environment surrounding the vehicle 10. The obstruction detection module 120 processes the sensor data 150 to determine if a field of view of one of the sensing devices is obstructed. For example, the obstruction can be detected according to any number of detection methods.

In various embodiments, the obstruction detection module 120 detects obstructions via a visual freespace method. The visual freespace method, for example, evaluates images of the environment that are captured by cameras and determines freespace within the images. The visual freespace method then determines the maximum and the minimum heights of the freespace within the image, translates the maximum and the minimum heights to the corresponding lidar space, and evaluates the maximum and minimum heights in the lidar space to determine if an obstruction of the lidar exists and if so, a location within the lidar space of the obstruction.

In various embodiments, the obstruction detection module 120 further detects obstructions via a ray tracer method. The ray tracer method, for example, traces rays from lidar points to determine points where the lidar cannot see, these points are then turned into polygons, and the centroids of the polygons are used to determine whether an obstruction exists and if so, the location of the obstruction. As can be appreciated, in various embodiments, the visual freespace method and the ray tracer method can be implemented as standalone methods or in combination with each other or other methods not disclosed specifically herein.

The obstruction detection module 120 sets an obstruction flag 160 based on whether an obstruction exists (e.g., TRUE if determined to exist, and FALSE if determined not to exist). The obstruction detection module 120 sets an obstruction position 170 based on the determined location of the obstruction. For example, when using the ray tracer method, the obstruction position 170 is set to the centroid position (e.g., central point X, Y, Z coordinate in lidar space) of the obstruction. If, however, an obstruction does not exist, the obstruction position is set to zero or a null value.

The position determination module 130 receives the obstruction flag 160 and the obstruction position 170. The position determination module 130 determines a desired position 180 of the sensing device that has the detected obstruction based on the determined location of the obstruction. For example, the position determination module 130 sets the desired position 180 (e.g., a position that alleviates or removes the obstruction from the field of view of the sensing device) equal to the location of the obstruction plus an offset value. In various embodiments, the offset value can be a predefined value X (e.g., X number of inches, or X number of pixels) or dynamically defined based on a size of the obstruction. In various embodiments, the offset value can be applied to the X value, the Y value, and/or the Z value of the location (X, Y, Z coordinate) of the obstruction to adjust the height, the pitch, and/or the roll of the sensing device.

The actuator control module 140 receives the desired position 180 of the sensing device, and a current or actual position 190 of the sensing device. In various embodiments, the actual position 190 is sensed or predicted based on sensor information (e.g., position sensors provide a current position of the sensor, information from the sensor itself is processed to find a known point and determine the position relative to that point, or other methods may be used). The actuator control module 140 generates one or more control signals 200 to one or more actuators of a sensor mount associated with the sensing device to adjust the position of the sensing device to the desired position. For example, the actuator control module 140 determines control signals 200 based on a difference between the actual position 190 and the desired position 180 and generates the control signals 200 based on the difference.

Figure 5:
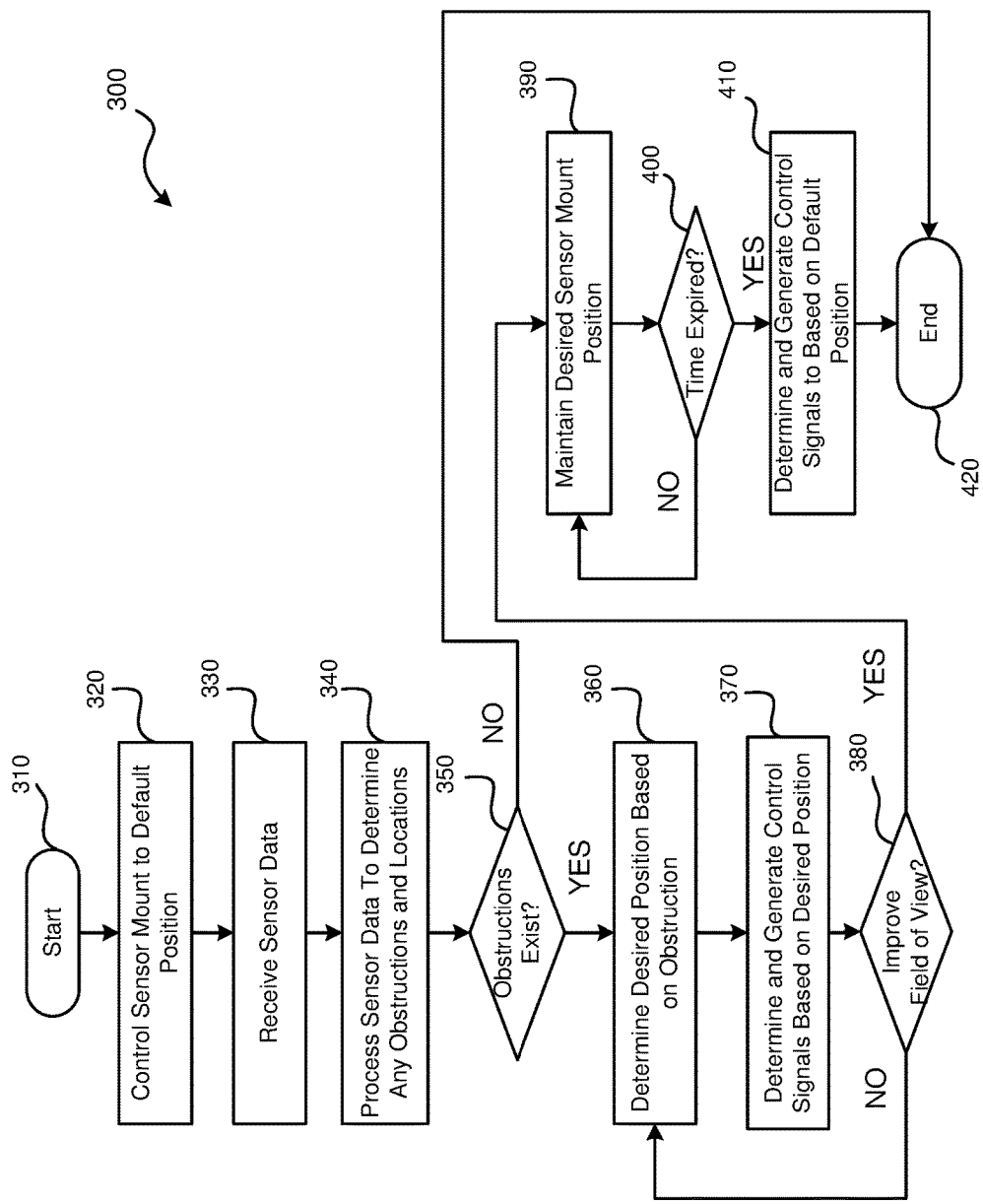
FIGS. 5, 6, and 7 are flowcharts illustrating methods for adjusting a sensing device of the vehicle in accordance with various embodiments.
Figure 6:
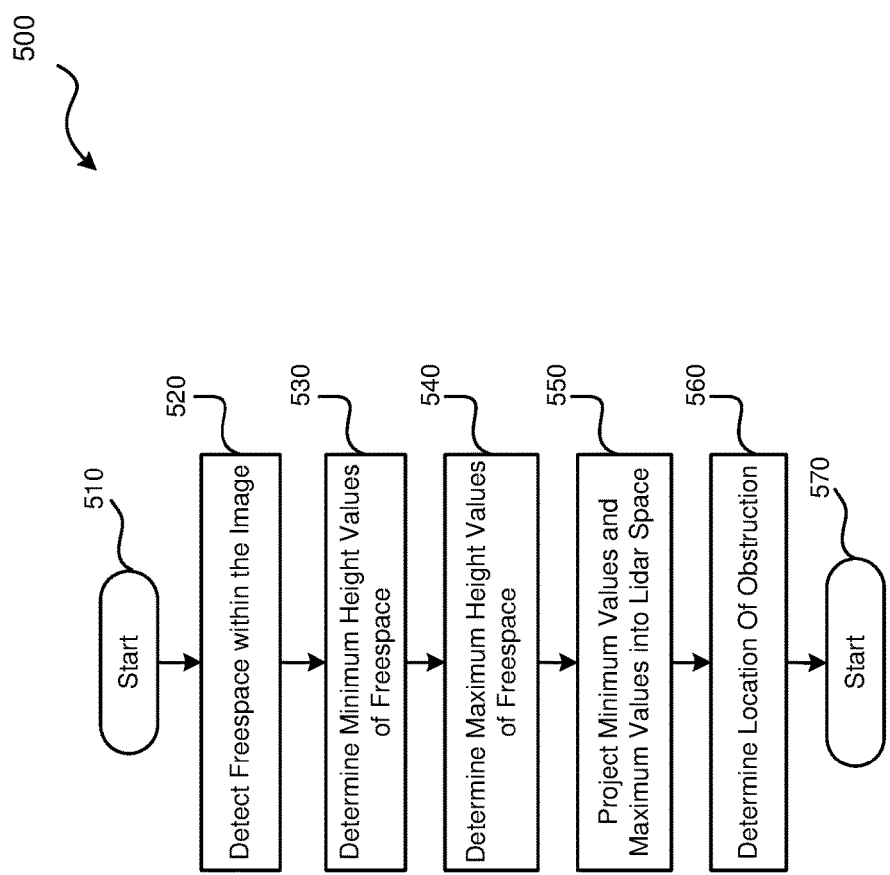
Figure 7:
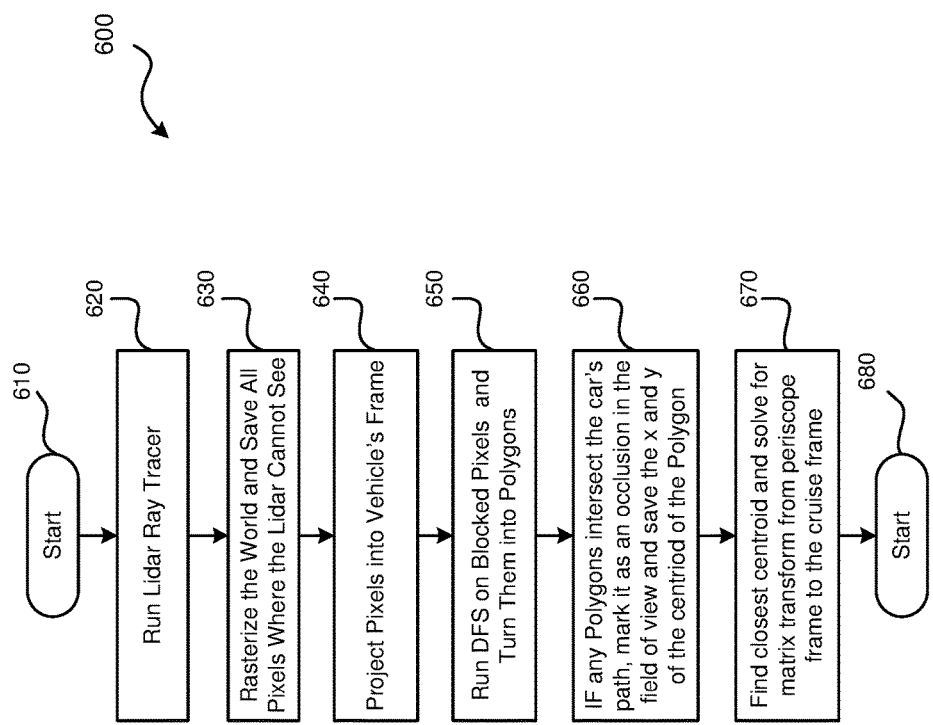

Referring now to FIGS. 5, 6, and 7, and with continued reference to FIGS. 1-4, flowcharts illustrate methods 300, 500, and 600 performed by the system 100 for adjusting the position of the sensing device of the vehicle 10, in accordance with the present disclosure. As can be appreciated in light of the disclosure, the order of operation within the methods 300, 500, 600 is not limited to the sequential execution as illustrated in FIGS. 5, 6, and 7 but may be performed in one or more varying orders as applicable and in accordance with the requirements of a given application. In various exemplary embodiments, the system 100 and methods 300, 500, 600 are run based on an occurrence of predetermined events, and/or can run at scheduled times during operation of the vehicle 10.

With initial reference to FIG. 5, the method 300 may begin at 310. The actuators of the sensor mount are controlled to a default position at 320. Sensor data is received at 330 and processed at 340 to determine any obstructions within the field of view (as will be discussed in more detail with regard to FIGS. 6 and 7). If no obstructions exist at 350, the method may end at 420.

If, however, obstructions exist at 350, a desired position is determined based on the determined location of the obstruction, and for example, a predefined offset, as discussed above at 360. Control signals are then determined based on the desired position and the actual position of the sensor and the control signals are generated to control the sensor mount at 370.

Sensor data is further processed at 380 to determine if the field of view is improved. If the field of view has not improved at 380, the method 300 continues with determining a desired position based on the location of the existing obstruction at 360; and generating control signal to control the sensor mount at 370. Once, the field of view has improved at 380, the desired sensor mount position is maintained at 390 until it is determined that the obstruction should no longer exist and/or a timer expires at 400. Once it is determined that the obstruction should no longer exist and/or a timer expires at 400, control signals are then determined based on the default position (the original position the sensor was at prior to movement or some other position) and the actual position and the control signals are generated to control the sensor mount at 410. Thereafter, the method may end at 420.

With reference now to FIG. 6, a method 500 relating to steps 340, 380 of FIG. 5 for determining obstructions and locations of the obstructions is provided. In various embodiments, the method is a visual freespace method and may begin at 510.

Image data is processed to determine freespace within an image depicting the environment surrounding the vehicle 10 at 520. The minimum heights of the freespace and the maximum heights of the freespace (e.g., minimum and maximum Y values of the X, Y, Z coordinates that define the freespace) are determined at 530 and 540 respectively. For example, some minimum heights may reflect the road surface while other maximum heights may reflect branches of a tree hanging over the road surface.

The minimum heights values and the maximum height values are then projected into the lidar space that corresponds to the image data at 550. The minimum lidar point values and the maximum lidar point values are then compared to minimum thresholds and maximum thresholds respectively at 560 to determine if an obstruction exists. These thresholds can be predetermined based on, for example, values defining a preferred field of view or a field of view typically relied upon in navigation. For example, if a consecutive number X of minimum values is above a minimum threshold, then an obstruction is determined to exist. In another example, if a consecutive number X of maximum values is below a maximum threshold, then an obstruction is determined to exist. The location of the obstruction is set at 560, for example, as being equal to the minimum height value or the maximum height value that is above or below the respective threshold. Thereafter, the method may end at 570. As can be appreciated, this method detects obstructions when an object is in front of the vehicle or at an intersection with other vehicles obstructing the field of view.

With reference now to FIG. 7, a method 600 relating to step 340 of FIG. 5 for determining obstructions and locations of the obstructions is provided. In various embodiments, the method is a ray tracer method and the method may begin at 610.

Lidar data is processed with a ray tracer to produce ray data at 620. The ray data is rasterized and all pixels where the lidar cannot see (pixels an initial or first pixel along an axis) are saved at 630. The saved pixels are then projected to the vehicle's coordinate system at 640. A depth-first search (DFS) is run on the saved pixels to determine polygons within the lidar space at 650. The polygon positions are then determined to see if they intersect the vehicle's upcoming path at 660. If the polygon intersects the vehicle's upcoming path at 660, the polygon is determined to be an obstruction and the X, Y centroid position of the polygon is saved. The saved centroid positions are evaluated at 670 and the closest centroid position to the vehicle is determined and the transformation is solved to obtain the vehicle coordinate system at 670. Thereafter, the method may end at 680.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

The invention claimed is:

1. A system for adjusting a position of a sensing device relative to a vehicle, comprising:
   the sensing device configured to provide sensor data associated with an environment of the vehicle;
   an adjustable sensor mount that mounts the sensing device to the vehicle and that adjusts at least one of a pitch, yaw, and roll of the sensing device; and
   a control module configured to, by a processor, determine a representation of the environment of the vehicle based on the sensor data, process the representation to determine an obstruction within a field of view of the sensing device, determine a location of the obstruction, determine a desired position of the sensing device based on the location of the obstruction, and to control the adjustable sensor mount based on the desired position.

2. The system of claim 1, wherein the control module is configured to determine the obstruction within the field of view based on an analysis of free space within an image of the environment.

3. The system of claim 2, wherein the control module is further configured to determine the obstruction within the field of view based on an analysis of a minimum height of the freespace within the image of the environment.

4. The system of claim 2, wherein the control module is further configured to determine the obstruction within the field of view based on an analysis of a maximum height of the freespace within the image of the environment.

5. The system of claim 2, wherein the control module is further configured to determine the obstruction within the field of view based on a translation of values in the free space to values in lidar space.

6. The system of claim 1, wherein the control module is configured to determine the obstruction within the field of view based on ray tracing of lidar data.

7. The system of claim 6, wherein the control module is further configured to determine the obstruction within the field of view based on a polygon determined from the ray tracing.

8. The system of claim 7, wherein the control module is configured to determine the polygon based on a depth-first search method.

9. The system of claim 7, wherein the control module is further configured to determine the obstruction within the field of view based on a centroid position of the polygon determined from the ray tracing.

10. The system of claim 1, wherein the processor is further configured to determine the desired position by setting the desired position to the location of the obstruction plus an offset value.

11. The system of claim 1, wherein the offset value includes a predefined.

12. They system of claim 1, wherein the offset value includes a dynamically determined value.

13. A method for adjusting a position of a sensing device relative to a vehicle, comprising:
- receiving, by a processor, sensor data sensed from an environment of the vehicle;
- processing, by the processor, the sensor data to determine an obstruction within a field of view of the sensing device and a location of the obstruction;
- determine a desired position of the sensing device based on the location of the obstruction, and
- generating, by the processor, control signals to control a position of an adjustable sensor mount based on the desired position.

14. The method of claim 13, further comprising determining, by the processor, the obstruction within the field of view based on an analysis of free space within an image of the environment.

15. The method of claim 14, wherein the determining, by the processor, the obstruction within the field of view is based on an analysis of a minimum height of the freespace within the image of the environment.

16. The method of claim 14, wherein the determining, by the processor, the obstruction within the field of view is based on an analysis of a maximum height of the freespace within the image of the environment.

17. The method of claim 14, wherein the determining, by the processor, the obstruction within the field of view is based on a translation of values in the free space to values in lidar space.

18. The method of claim 13, further comprising determining, by the processor, the obstruction within the field of view based on ray tracing of lidar data.

19. The method of claim 18, wherein the determining, by the processor, the obstruction within the field of view is based on a centroid position of a polygon determined from the ray tracing.

20. The method of claim 19, further comprising determining, by the processor, the polygon based on a depth-first search method.

* * * * *